(12) United States Patent
Hsu et al.

(10) Patent No.: US 6,846,096 B2
(45) Date of Patent: Jan. 25, 2005

(54) COOLING APPARATUS FOR PROJECTOR

(75) Inventors: Nien-Hui Hsu, Hsin-Chu (TW); Shang-Hsuang Wu, Hsin-Chu (TW)

(73) Assignee: Coletronic Corporation, Hsin-Chu (TW)

( * ) Notice: Subject to any disclaimer, the term of this patent is extended or adjusted under 35 U.S.C. 154(b) by 140 days.

(21) Appl. No.: 10/249,121

(22) Filed: Mar. 18, 2003

(65) Prior Publication Data

US 2003/0179579 A1 Sep. 25, 2003

(30) Foreign Application Priority Data

Mar. 22, 2002 (TW) .................................. 91203833 U

(51) Int. Cl.$^7$ ............................................. F21V 29/02
(52) U.S. Cl. ....................... 362/294; 362/218; 362/480; 362/543
(58) Field of Search ................................ 362/294, 218, 362/264, 345, 373, 480, 547; 352/202; 353/57, 58, 60, 61

(56) References Cited

U.S. PATENT DOCUMENTS 6,280,038 B1 * 8/2001 Fuse et al. ..................... 353/57
6,443,575 B1 * 9/2002 Miyamoto et al. ............ 353/58

* cited by examiner

Primary Examiner—Sandra O'Shea
Assistant Examiner—Mark Tsidulko
(74) Attorney, Agent, or Firm—Winston Hsu

(57) ABSTRACT

The present invention discloses a partition is incorporated into the case of the projector so as to separate the optical system and the circuitry system. A circuitry fan is used to cool the circuitry system. The optical system is cooled by a suction fan. The cooling air is drawn in by the suction fan and directed to a lamp case through an air duct so as to cool a burner within the lamp case. The heat air is then directed to manifold duct. A first outlet of the manifold duct is directed through an exhausting duct to an exhausting fan. The other outlet of the manifold duct is directed to the circuitry fan. As a result, the heated air is discharged out of the case by those two cooling fans so as to evenly discharge the heated airflow from the lamp case, reducing the heat load of the fan and prolongs the lifespan of the fan.

8 Claims, 5 Drawing Sheets

| Light Source lamp : 130W | Before Modification | After Modification | Temp. Differential |
|---|---|---|---|
| Exhaust fan | 85° C | 70° C | -15° C |
| Circuitry Fan | 55° C | 65° C | +10° C |

FIG.4

COOLING APPARATUS FOR PROJECTOR

BACKGROUND OF INVENTION

1. Field of the Invention

The present invention relates to a projector, and more particularly, to a cooling apparatus for projector.

2. Description of the Prior Art

With the benefit of the developed electro-optics technologies, a high power light source has been incorporated into a projector so as to project a more sharper and brighter image over the screen facilitating an excellent briefing and presentation results toward the viewers. However, high power light source generates high heat.

Even a cooling fan has been incorporated to dissipate the heat, the high power light source is too hot which increases the working temperature of the cooling fan noises will be heavily increased by increasing the rotational speed of the fan as well as putting more cooling fans into the system. It has become a tough issue to provide an efficient cooling effect while reduces the acoustic noises.

Please refer to FIG. 1, which is an optical system according to the prior art. The optical system comprises an illumination system 10 and an imaging system 20. The illumination system 10 includes a light source 11 emitting a light beam toward a lens array 12. The lens array 12 comprises a plurality of small lens which jointly to evenly distribute the brightness of the light beam. Finally, the light beam pass through an illumination lens set 13 to converge the light beam into the imaging system 20. The imaging system 20 separates the light beam into red light and other visible lights through a first dichroic mirror 21. The red light is reflected by the first dichroic mirror 21 and enters the first reflection mirror 211. The red light further enters a first lens set 212 consist of a retarder, a liquid crystal display and a polarizer. The red light then enters the X-prism 24, while the other visible lights transmit through the first dichroic mirror 21 and enters a second dichroic mirror 22. The other visible lights is separated into blue and green lights by the second dichroic mirror 22. The blue light is reflected by the second dichroic mirror 22 and enters a second lens set 221 consist of a retarder, a liquid crystal display and a polarizer. The green light passes through the second dichroic mirror 22, the third reflection mirror 222 and fourth reflection mirror 223, and enters a third lens set 224 consist of a retarder, a liquid crystal display and a polarizer. The red, green and blue lights is synthesized by the X-prism then penetrate through a projection lens 25 and project onto the screen (not shown).

As shown in FIG. 2, the illumination system 10 uses a lamp of high power. Except the light source 11 has to cool, the optical system components which is heated up by the light beam has to been cooled as well so as to prolong the lifespan otherwise the characteristics and lifespan of the optical system components will be deteriorated. In the conventional projector, a main fan 31 is disposed on a case 30 which is located behind the light source 11 so as to cool the components of the imaging system 20 and the illumination system 10. In addition, in order to prevent the circuitry system34 from being heated, a partition 35 has been incorporated to as to isolate the circuitry system 34 and the optical system. In addition, a circuitry fan 36 has been used to cool the circuitry system 34. In addition, in order to efficiently cool the burner 112 within the lamp case 111, an auxiliary fan 32 located at the partition 35 adjacent the light source 11 is used to draw the cooling air into the circuitry system 34, as shown by the arrow. The cooling air is then guided by a duct 33 toward the lamp case 111. As a result, the cooling air is guided from one front end of the inner of the lamp case 111 to cool the burner 112 and the radiant heat of the inner of the lamp case 111. The heated air is guided to the front end of the lamp case 111 and exhausted from the case 30 by the main fan 31.

However, in the conventional projector, the heated air from the optical system and the circuitry system 34 is exhausted only by the main fan 31. As such, the working temperature of the main fan 31 is increased tremendously thereby shorting its lifespan. Even the rotational speed of the fan can be increased, more fans can be put into the projector, cost and acoustic noises will inevitably increase as well. Furthermore, the controlling system will become more complicated and reducing the reliability and the quality.

SUMMARY OF INVENTION

It is an object of the present invention to provide a cooling apparatus for projector which dissipating heat evenly by different fans for increasing the cooling effect and reducing the working temperature of the main fan. Therefore the lifespan of the fan is prolonged and the quality is increased.

In order to achieve the object set forth, a partition is incorporated into the case of the projector so as to separate the optical system and the circuitry system. A circuitry fan is used to cool the circuitry system. The optical system is cooled by a suction fan. The cooling air is drawn in by the suction fan and directed to a lamp case through an air duct so as to cool a burner within the lamp case. The heat air is then directed to manifold duct. A first outlet of the manifold duct is directed through an exhausting duct to an exhausting fan. The other outlet of the manifold duct is directed to the circuitry fan. As a result, the heated air is discharged out of the case by those two cooling fans so as to evenly discharge the heated airflow from the lamp case.

These and other objectives of the claimed invention will no doubt become obvious to those of ordinary skill in the art after reading the following detailed description of the preferred embodiment that is illustrated in the various figures and drawings.

BRIEF DESCRIPTION OF DRAWINGS

FIG. 4 is a table showing the experimental result.

DETAILED DESCRIPTION

Figure 1:
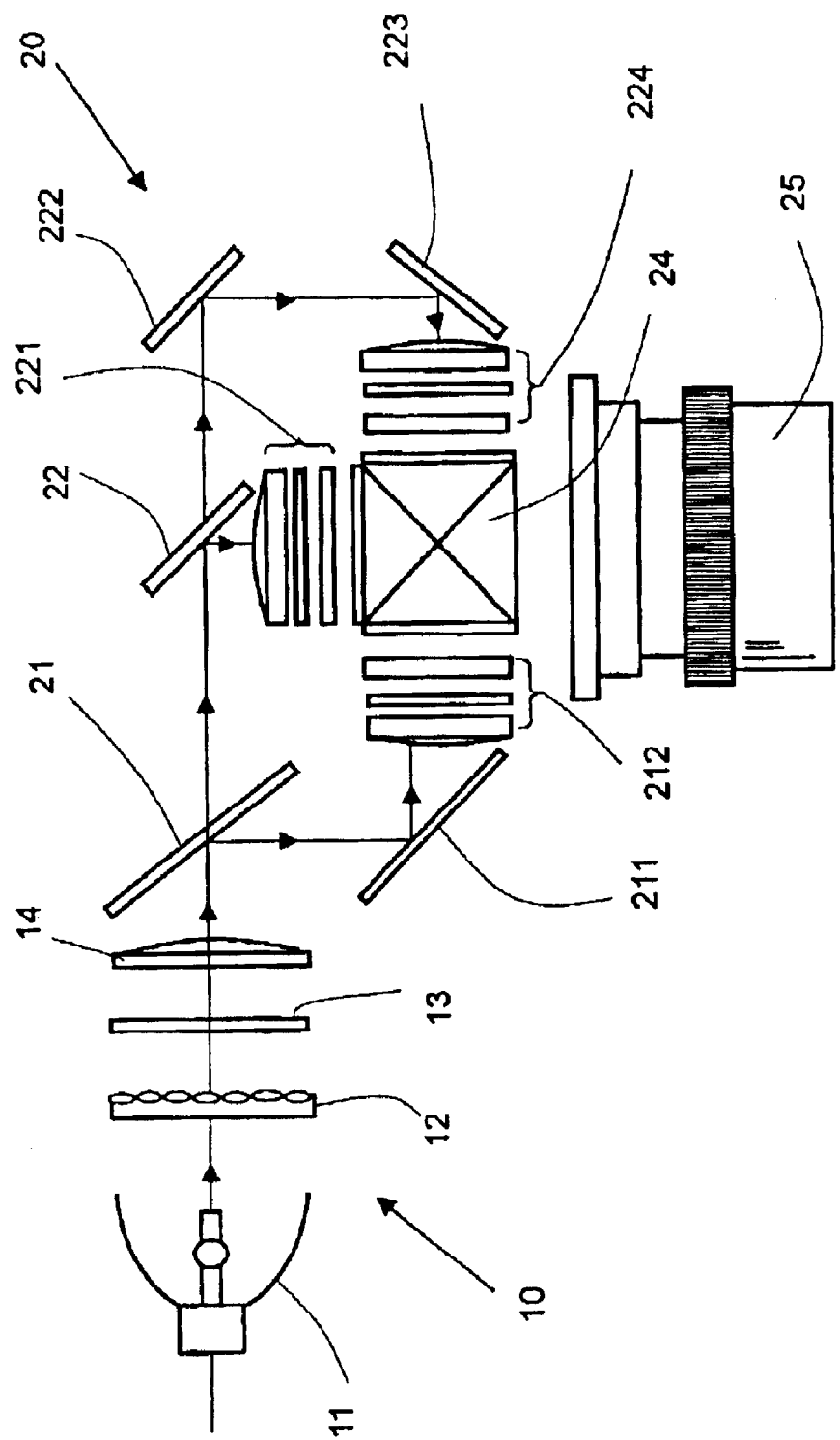
FIG. 1 is a view showing the structure of a conventional projector.
Figure 2:
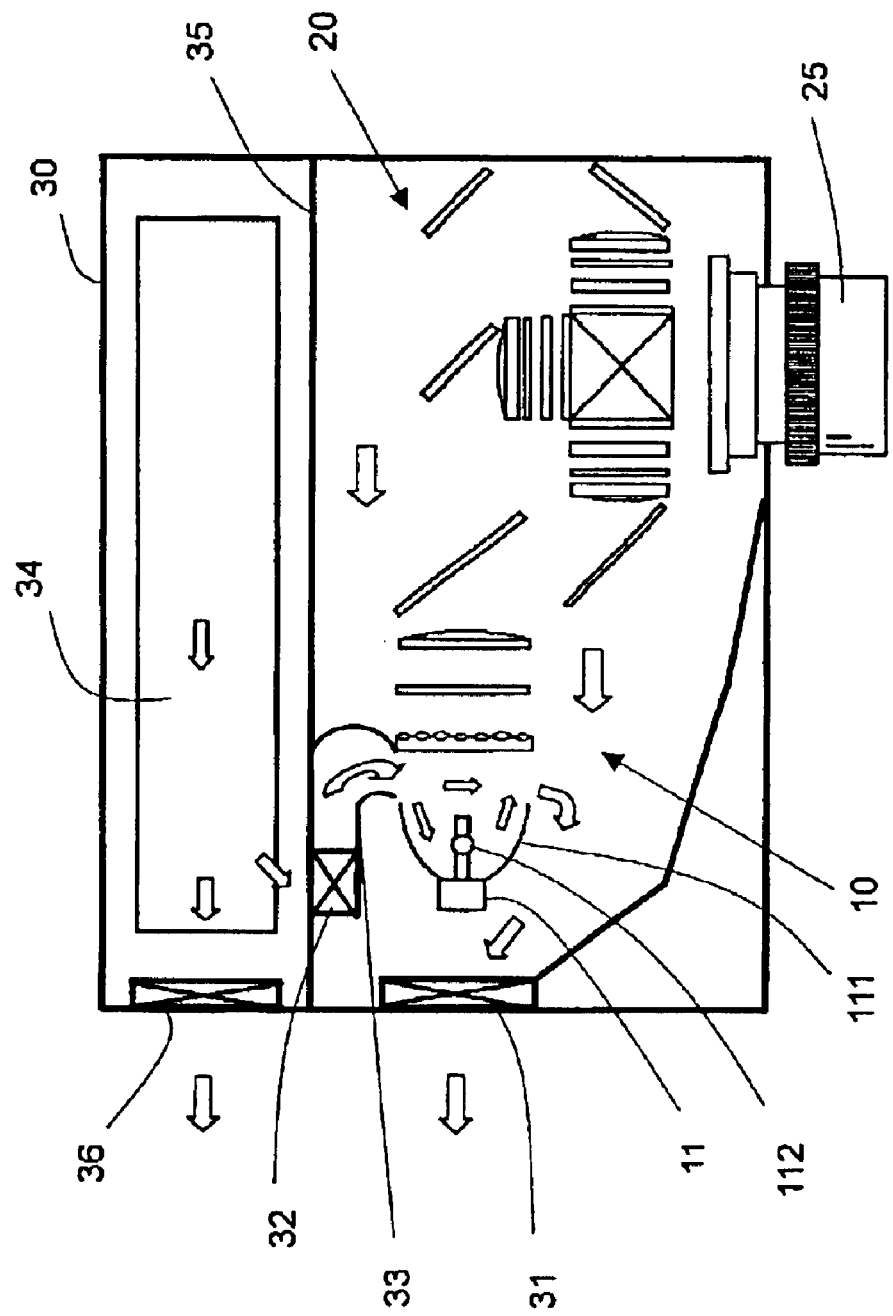
FIG. 2 is a view showing the cooling apparatus of FIG. 1.
Figure 3:
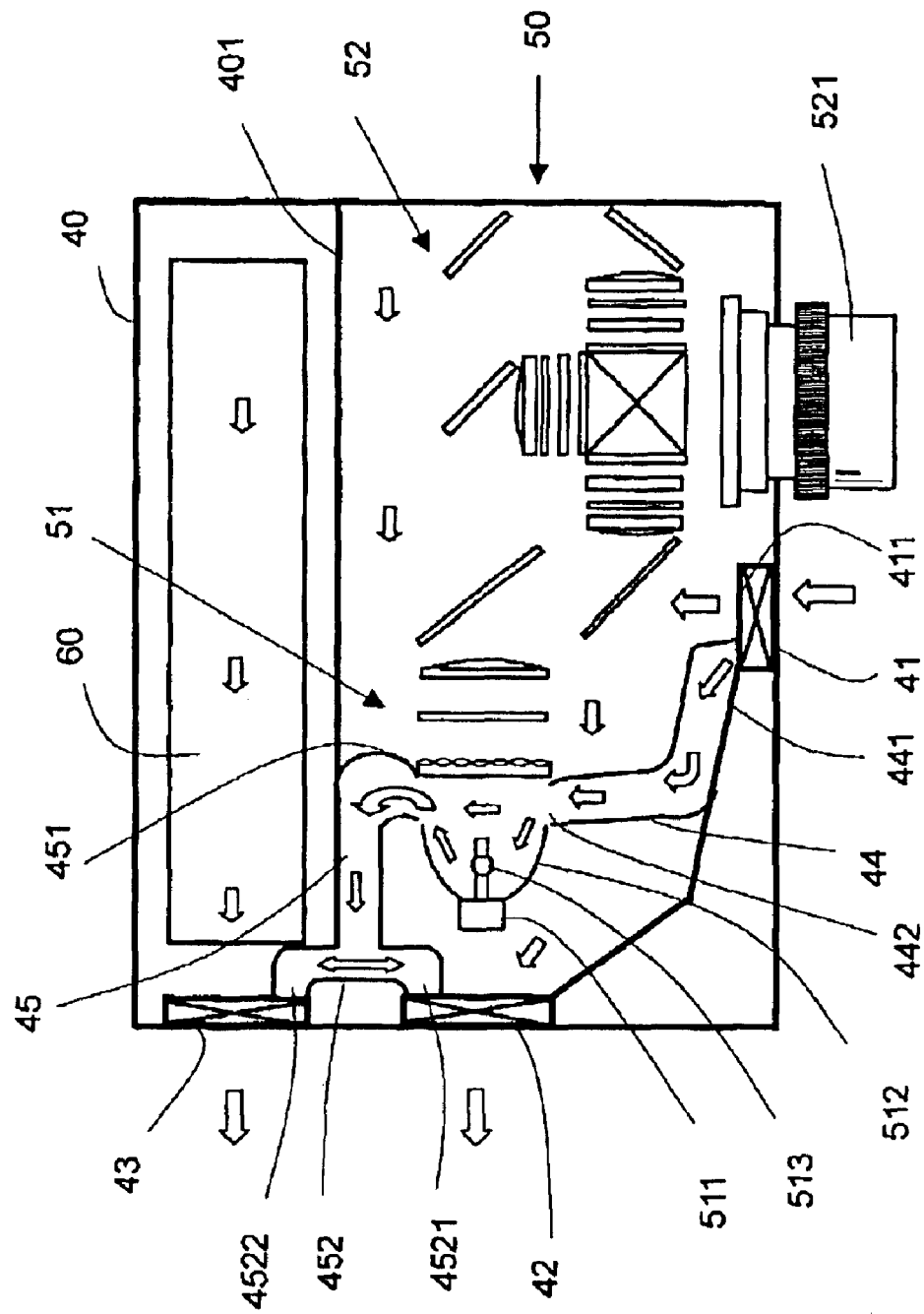
FIG. 3 is a view showing the structure of a cooling apparatus for projector of first embodiment in accordance with the present invention.

Referring to FIG. 3, which is a view showing the structure of a cooling apparatus for projector of first embodiment in accordance with the present invention. The present invention includes a case 40 having an optical system 50 and a circuitry system 60 separated by a partition 401 mounted therein. The circuitry system 60 is cooled by a circuitry fan 43 mounted on the case 40. The optical system 50 is cooled by a suction fan 41 and an exhausting fan 42, both mounted in the other sides of the case, together with the air ducts 44 and 45. Accordingly, the working temperature within the projector is controlled.

The optical system 50 includes an illumination system 51 and an imaging system 52. The projection lens 521 of the imaging system 52 protrudes from a side of the case 40. The case 40 is provided with a suction fan 41 adjacent to the projection lens 521 for cooling the components of the imaging system 52 and the illumination 51. The case 40 is further-provided with an exhausting fan 42 behind a light source 511 within the case 40. Accordingly, the cooling air of the imaging system 52 is through the light source 511, which is highly heated, and the components of the illumination system 51. Finally, the cooling air flows through a lamp case 512 of the light source 511 and is discharged out of the case 40. An exhausting outlet 411 of the suction fan 41 is provided with an air duct 44 extended toward the front portion of the lamp case 512. Inlet 441 of the air duct 44 aligns and covers the exhausting outlet 411 of the suction fan 41. The air duct 44 extends from the exhausting outlet 411 of the suction fan 41 to a front portion of the lamp case 512. An outlet 442 of the air duct 44 aims toward one side of the front portion of the lamp case 512 and is further directed to a burner 513 within the lamp case 512.

In addition, an opposite side of the lamp case 512 is provided with an exhausting duct 45. The inlet of the exhausting duct 45 closely arranges to the front portion of the lamp case 512 and the exhausting duct 45 extends along the partition 401 toward a rear portion of the light source and finally terminated into a manifold duct 452. The first output 4521 of the manifold duct 452 extends toward the exhausting fan 42, the second output 4522 extending through the partition 401 to the circuitry fan 43. The outlets 4521 and 4522 partially aim and cover suction inlets 421 and 431 of the exhausting fan 42 and the circuitry fan 43 for forming a dissipating heat duct.

According to the arrangement and layout of the first embodiment, as shown by the arrow, partial airflow from the suction fan 41 through the air duct 44 flows through one front partition of the lamp case 512 for cooling the burner 513 within the lamp case 512 and the interior reflection surface of the lamp case 512. The heated airflow flows from the lamp case 512 to the exhausting duct 45, following to the manifold duct 452, the first outlet 4521 and the second outlet 4522, and finally to the exhausting fan 42 and the circuitry fan 43, respectively. Finally, the heated are exhausted outside the case 40. By this arrangement, the exhausting fan 42 and the circuitry fan 43 evenly share the heated airflow thereby preventing the exhausting fan 43 from overheated. Furthermore, the suction fan 41 draws cooling air directly from outside of the case 40, thereby effectively cools the optical system and increase the cooling effect of the inter side of the light source 511. Moreover, the cross sections of the air duct 44 and the exhausting duct 45 occupy partial portion of the effected inhaling/exhaling area of the suction fan 42, exhausting fan 43 and the circuitry fan 43, it will not negatively influence to the intended cooling purposes of those fans. Thus, proper working temperature inside the projector can be ensured.

As shown in FIG. 4, a measurement of the temperature has been conducted so as to compare the working temperature before and after the cooling apparatus is incorporated within the case 40. The light source lamp is 130 watt. Before the system is modified, the outlet temperature of the exhausting fan 42 is about 85 degrees Celsius, the outlet temperature of the circuitry fan 43 is around 55 degrees Celsius. After the cooling apparatus is incorporated, the outlet temperature of the exhausting fan 42 is dropped to 70 degrees Celsius, a drop of 15 degrees Celsius is attained, while the outlet temperature of the circuitry fan 43 is increased to 65 degrees Celsius, a 10 degrees Celsius increased. By this arrangement, while the working temperature of the projector is preferably kept within the accepted range, even the working temperature of the circuitry fan 43 is increased, it is still within the accepted limit, below 70 degrees Celsius. However, the working temperature of the exhausting fan is tremendously reduced to 70 degrees Celsius, while is 15 degrees Celsius lower than the original arrangement. Therefore, the present invention increases the lifespan of the exhausting fan and decreases the noise of the fan.

Figure 5:
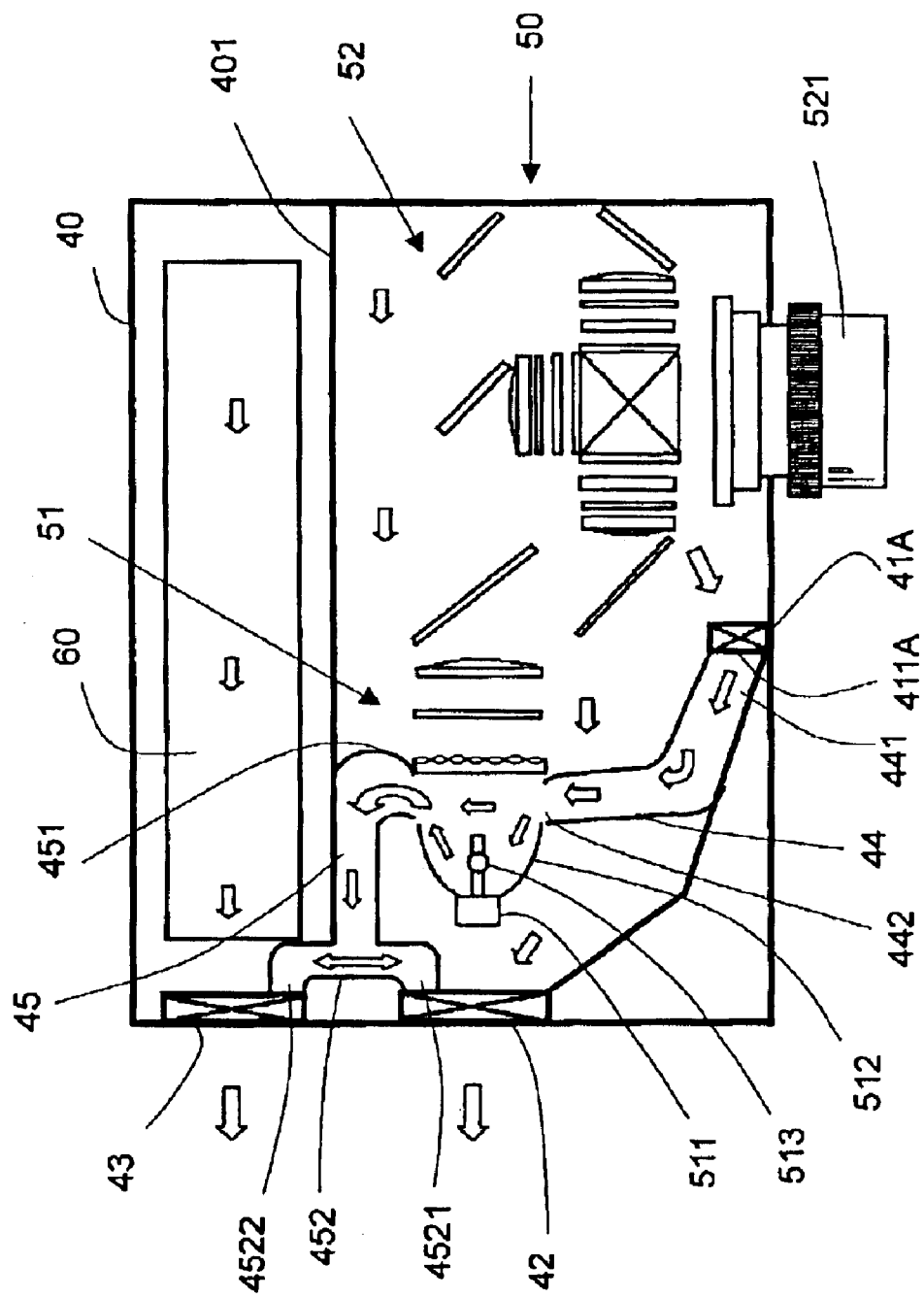
FIG. 5 is a view showing the structure of a cooling apparatus for projector of second embodiment in accordance with the present invention.

As shown in FIG. 5, a second embodiment in accordance with the present invention is shown and which has a similar structure as the first embodiment. The case 40 includes an optical system 50 and a circuitry system 60 which are separated by the partition 401. The circuitry system 60 is cooled by the circuitry fan 43 mounted in the case 40 adjacent the circuitry system 60. The optical system 50 is provided with an suction fan 41A, an exhausting fan 42, an air duct 44 and an exhausting duct 45 for cooling. The difference between the first and second embodiments is the suction fan 41A draws the cooling air of the imaging system 52. The cooling airflow is guided from an exhausting outlet 41A of the air duct 44 to a front portion of the lamp case 512. Then the airflow flows into the lamp case 512 to cool the lamp case 512. The heated airflow is then guided to the exhausting duct 45, the outlets 4521, 4522 of the manifold duct 452, and finally to the exhausting fan 42 and the circuitry fan 43. By this arrangement, both the fans 42 and 43 contribute the heat dissipation of the lamp case 512 evenly. As a result, the working temperature of the exhausting fan 42 can be prevented from overheating. By this arrangement, the exhausting fan 41 A can effectively increase the cooling effect of the imaging system 52, while evenly distribute the generated heat, and increases the lifespan of the fans.

Similarly, by the overall arrangement of the fans of the projector, the working load can be suitably distributed evenly to each fan. Furthermore, the imaging system 52 is not limited to the system described in the embodiments, as well as the conventional transparent liquid crystal display. It covers reflective crystal display or digital micro-mirror device as long as there is cooling apparatus for the light source. On the other hand, even the fans are arranged on side of the case 40, it can be arranged to other sides based on the techniques of even distribution of the heat such as suggested by the present invention.

What is claimed is:

1. A cooling apparatus for projector, comprising:
   a light source;
   an exhausting fan located adjacent to the light source and having a suction inlet;
   a circuitry fan arranged adjacent to the exhausting fan and having a suction inlet;
   an suction fan having an exhausting outlet;
   an air duct having an inlet connected to the exhausting outlet of the suction fan, an outlet extending toward a location in front portion of the light source; and
   an exhausting duct having an inlet located at the other side of the front portion of the light source, the exhausting duct having an outlet forming a manifold duct directing cooling air toward and covering partially exhausting outlet of the exhausting fan and the circuitry fan.

2. The cooling apparatus for projector of claim 1, wherein the exhausting fan is located behind the light source.

3. The cooling apparatus for projector of claim 1, wherein the projector further includes an imaging system which is cooled by the suction fan.

4. The cooling apparatus for projector of claim 3, wherein the suction fan inhales cooling air from the environment, and the inlet of the air duct covers the partial exhausting outlet of the suction fan.

5. The cooling apparatus for projector of claim 3, wherein the suction fan inhales the airflow from the imaging system, and the inlet of the air duct cover the exhausting outlet of the suction fan.

6. The cooling apparatus for projector of claim 1, wherein the light source includes a lamp case in which a burner is installed.

7. The cooling apparatus for projector of claim 6, wherein the outlet of the air duct directs the cooling air toward the lamp case.

8. The cooling apparatus for projector of claim 1, wherein the projector including a circuitry system which is separated from an optical system by a partition thereby forming an isolated area cooled by the circuitry fan.

* * * * *

UNITED STATES PATENT AND TRADEMARK OFFICE
CERTIFICATE OF CORRECTION

PATENT NO. : 6,846,096 B2
APPLICATION NO. : 10/249121
DATED : January 25, 2005
INVENTOR(S) : Hsu et al.

It is certified that error appears in the above-identified patent and that said Letters Patent is hereby corrected as shown below:

On the title page item (73), delete "Coletronic Corporation" and insert --Coretronic Corporation--

Signed and Sealed this

Tenth Day of April, 2007

JON W. DUDAS
*Director of the United States Patent and Trademark Office*